Feb. 7, 1928.
R. F. WATSON
1,658,470
MACHINE FOR CUTTING OIL GROOVES AND THE LIKE
Filed Nov. 6, 1925
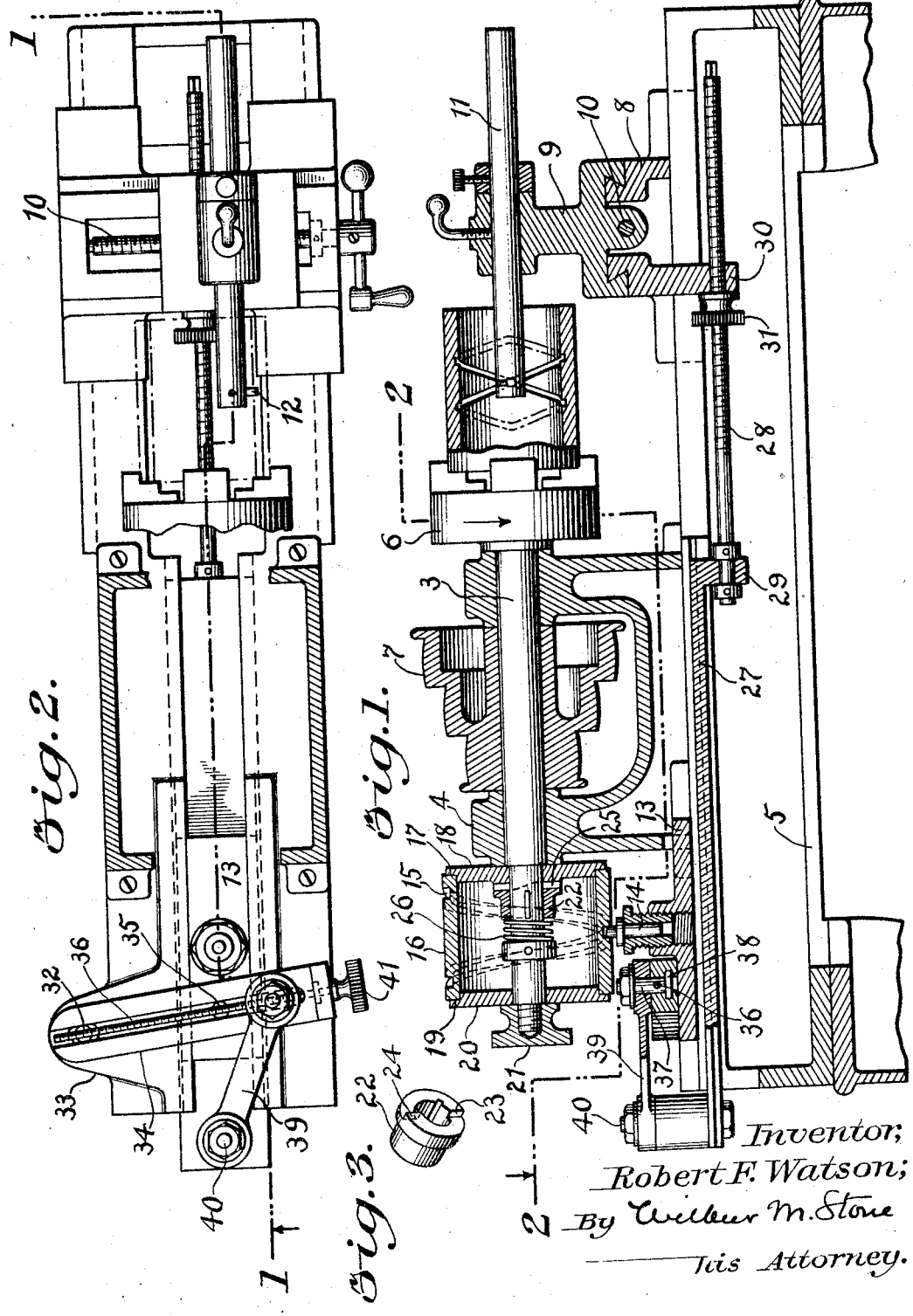
Inventor;
Robert F. Watson;
By Wilbur M. Stone
His Attorney.

Patented Feb. 7, 1928.

1,658,470

UNITED STATES PATENT OFFICE.

ROBERT F. WATSON, OF EAST BOUNDBROOK, NEW JERSEY, ASSIGNOR TO WATSON BROTHERS MACHINE COMPANY, INCORPORATED, OF EAST BOUNDBROOK, NEW JERSEY, A CORPORATION OF NEW JERSEY.

MACHINE FOR CUTTING OIL GROOVES AND THE LIKE.

Application filed November 6, 1925. Serial No. 67,244.

This invention relates to machines for cutting oil grooves and the like and has for its object to provide a machine of the class specified, of simple construction and easily adaptable to various types of grooving.

With these ends in view my improvements comprise features illustrated in their preferred embodiment in the drawing accompanying this specification, wherein:—

Figure 1 is a sectional elevation on line 1—1 of Fig. 2. Fig. 2 is a plan view, partly in section, on line 2—2 of Fig. 1, corresponding with the showing of Fig. 1. Fig. 3 is a perspective view of a detail of the machine. The several views are to one scale.

My improved machine is particularly useful for cutting channels of any desired pattern, preferably endless, on the inside of a hollow bearing or on the outside of the bearing portion of a shaft. It will be obvious to those skilled in the art that other similar uses, such for instance as cutting cams, fall within the scope of said machine.

Referring now more particularly to the drawing, rotatable spindle 3, having bearings in head 4 fixed to bed 5, may be fitted with the usual chuck 6 and pulley 7. Facing chuck 6 is tool-carriage 8, mounted for movement lengthwise bed 5, and having slide 9 mounted for transverse movement thereon by means of screw 10, all as well known in the art. Tool-holder 11, preferably a cylindrical rod, is adjustably fixed in the upper part of slide 9 at about the height of spindle 3 and preferably in parallelism therewith. Cutting tool 12 is removably secured in the left hand end of said holder 11.

For causing carriage 8 to traverse back and forth on bed 5 the following means are provided: Mounted for movement lengthwise bed 5 is slide 13 having pin 14 vertically adjustable therein for engagement with cam groove 15 in cam 16. Said cam 16 is releasably fixed to the rear end of spindle 3 and is preferably in the form of a hollow cylinder, fitting snugly at one end on seat 17 of cam head 18 rotatably mounted on spindle 3, and at the other end on seat 19 of cam head 20. Said head 20 is removable for the releasing of cam 16 by unscrewing nut 21 in threaded engagement with the left-hand end of spindle 3. For causing cam 16 to be rotated by spindle 3, clutch 22 is slidably keyed to spindle 3 within said cam and is provided with diametrally opposite clutch teeth 23, 24 for engagement with similar teeth, as 25, on the rear face of head 18. Said clutch 22 is urged toward head 18 by spring 26. By this means when spindle 3 is rotated forwardly, in the direction of the arrow on chuck 6, cam 16 is rotated therewith. As spindle 3 and cam 16 are rotated forwardly the engagement of pin 14 of slide 13 in cam groove 15 will cause said slide to traverse back and forth in its guideway in bed 5 parallel with spindle 3. For transmitting movement from slide 13 to tool-carriage 8 and tool 12, a second slide 27, mounted for movement in bed 5 below and parallel with slide 13 is provided. This slide 27 is adjustably connected with carriage 8 by means of long screw 28, mounted for rotation but held against endwise movement in ear 29 of slide 27. Said screw is in threaded engagement with ear 30 of carriage 8 and may be releasably secured against turning therein by lock nut 31. Pivoted for slight endwise movement at 32 in ear 33, extending rearwardly from bed 5, is arm 34 and said arm is also pivoted at 35 in slide 13. Mounted for rotation, but held against endwise movement in said arm 34, is screw 36 in threaded engagement with nut 37. Said nut is provided with head 38 slidable in a suitable guideway in said arm. Said nut 37 has a cylindrical body on which is pivoted one end of link 39, the other end of said link being pivoted at 40 to slide 27. By means of head 41, screw 36 may be rotated to move nut 37 toward and from pivot 32, whereby the movement of slide 13 may be transmitted to slide 27 in varying amounts as desired, thereby changing the amount of travel of carriage 8 and tool 12. By means of clutch 22, cam 16 may be given a half rotation when desired so as to enable tool 12 to cut a second groove in the work in chuck 6, 180 degrees from the first groove. Cam 16, by the removal of nut 21, may be removed from spindle 3 and a cam having any other desired pattern of cam groove substituted.

The operation of the machine will be readily understood from the foregoing description of its construction.

I claim:

1. In a machine of the character described the combination of a rotatable work-holding spindle, a tool-carriage mounted for movement toward and from the work-holding end of said spindle, a tool on said carriage, a cylindrical cam mounted on said spindle, a slide mounted for movement adjacent said cam in parallelism with said spindle, means operatively connecting said cam and slide, a second slide mounted for movement in parallelism with said spindle adjacent said first mentioned slide, means for transmitting motion from said first slide to said second slide, means between said slides for modifying the amount of motion thus transmitted including an arm pivoted at a point remote from said first mentioned slide, means operably connecting said arm and slide, a link connecting said second slide and said arm, and means for shifting the point of connection of said link and second slide toward and from the pivotal point of said arm.

2. In a machine of the character described the combination of a rotatable work-holding spindle, a tool-carriage mounted for movement toward and from the work-holding end of said spindle, a tool on said carriage, a cylindrical cam rotatably mounted on said spindle, a clutch slidably keyed to said shaft, means on said cam for engaging said clutch, spring means for urging said clutch to such engagement, a slide mounted for movement adjacent said cam in parallelism with said spindle, means operatively connecting said cam and slide, a second slide mounted for movement in parallelism with said spindle adjacent said first mentioned slide, means for transmitting motion from said first slide to said second slide, means for modifying the amount of motion thus transmitted including an arm pivoted at a point remote from said first mentioned slide, means operably connecting said arm and slide, a link connecting said second slide and said arm, and means for shifting the point of connection of said link and second slide toward and from the pivotal point of said arm.

In witness whereof, I hereby affix my signature this 4th day of November, 1925.

ROBERT F. WATSON.